United States Patent
Lee et al.

(10) Patent No.: US 8,213,530 B2
(45) Date of Patent: Jul. 3, 2012

(54) METHOD OF TRANSMITTING USING PHASE SHIFT-BASED PRECODING AND AN APPARATUS FOR IMPLEMENTING THE SAME IN A WIRELESS COMMUNICATION SYSTEM

(75) Inventors: Moon Il Lee, Gyeonggi-do (KR); Bin Chul Ihm, Gyeonggi-do (KR); Jae Wan Kim, Seoul (KR); Sung Ho Park, Seoul (KR); Wook Bong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/092,884

(22) Filed: Apr. 22, 2011

(65) Prior Publication Data

US 2011/0194650 A1    Aug. 11, 2011

Related U.S. Application Data

(60) Division of application No. 12/970,168, filed on Dec. 16, 2010, now Pat. No. 8,135,085, which is a continuation of application No. 11/858,082, filed on Sep. 19, 2007, now Pat. No. 7,881,395.

(60) Provisional application No. 60/826,143, filed on Sep. 19, 2006.

(30) Foreign Application Priority Data

Jan. 11, 2007   (KR) .............................. P2007-003281

(51) Int. Cl.
    *H04B 7/02*    (2006.01)
(52) U.S. Cl. ........ 375/267; 375/299; 375/347; 455/101; 455/132
(58) Field of Classification Search ................. 375/167, 375/299, 347, 267; 455/101, 132
    See application file for complete search history.

(56) References Cited

U.S. PATENT DOCUMENTS

| | | | |
|---|---|---|---|
| 6,298,092 B1 | 10/2001 | Heath, Jr. et al. | |
| 6,760,882 B1 | 7/2004 | Gesbert et al. | |
| 6,891,897 B1 | 5/2005 | Bevan et al. | |

(Continued)

FOREIGN PATENT DOCUMENTS

EP    1087545    3/2001

(Continued)

OTHER PUBLICATIONS

Athaudage, C.R.N., et al.; "An Efficient Framework to Exploit Frequency Diversity in OFDM: Precoding With Adaptive Subcarrier Selection"; The 17th Annual IEEE Int'l Symposium on Personal, Indoor, Mobile Radio Communications; Sep. 11, 2006.

(Continued)

*Primary Examiner* — Juan A Torres
(74) *Attorney, Agent, or Firm* — Lee, Hong, Degerman, Kang & Waimey

(57) ABSTRACT

According to one embodiment, a method of receiving signals from a transmitter having a plurality of antennas includes: receiving the signals from the transmitter; selecting a precoding matrix based on a multiplexing rate (R) by selecting R column vectors from a single matrix corresponding to a maximum multiplexing rate, wherein the maximum multiplexing rate corresponds to a number ($N_t$) of the plurality of antennas, wherein each column vector of a first precoding matrix corresponding to a first multiplexing rate is included as a part of column vectors of a second precoding matrix corresponding to a second multiplexing rate when the second multiplexing rate is greater than the first multiplexing rate; and processing the received signals using the selected precoding matrix.

10 Claims, 13 Drawing Sheets

U.S. PATENT DOCUMENTS

| | | | |
|---|---|---|---|
| 7,583,982 | B2 | 9/2009 | Olesen et al. |
| 7,609,613 | B2 | 10/2009 | Aghvami et al. |
| 7,620,019 | B1 | 11/2009 | Smith et al. |
| 7,636,297 | B1 | 12/2009 | Lee et al. |
| 7,702,029 | B2 | 4/2010 | Kotecha et al. |
| 7,729,432 | B2 | 6/2010 | Khan et al. |
| 7,813,330 | B2 | 10/2010 | Yu et al. |
| 7,839,944 | B2 | 11/2010 | Lee et al. |
| 7,899,132 | B2 | 3/2011 | Lee et al. |
| 2003/0048753 | A1 | 3/2003 | Jalali |
| 2003/0147343 | A1 | 8/2003 | Onggosanusi et al. |
| 2004/0192218 | A1 | 9/2004 | Oprea |
| 2005/0041751 | A1 | 2/2005 | Nir et al. |
| 2005/0201307 | A1 | 9/2005 | Chae et al. |
| 2005/0281350 | A1 | 12/2005 | Chae et al. |
| 2006/0013186 | A1 | 1/2006 | Agrawal et al. |
| 2006/0013328 | A1 | 1/2006 | Zhang et al. |
| 2006/0039489 | A1 | 2/2006 | Ikram et al. |
| 2006/0039500 | A1 | 2/2006 | Yun et al. |
| 2006/0067277 | A1 | 3/2006 | Thomas et al. |
| 2006/0067443 | A1 | 3/2006 | Liu et al. |
| 2006/0093062 | A1 | 5/2006 | Yun et al. |
| 2006/0098568 | A1 | 5/2006 | Oh et al. |
| 2006/0098760 | A1 | 5/2006 | Shen et al. |
| 2006/0140294 | A1 | 6/2006 | Hottinen et al. |
| 2006/0146692 | A1 | 7/2006 | Gorokhov et al. |
| 2006/0270360 | A1 | 11/2006 | Han et al. |
| 2007/0041457 | A1 | 2/2007 | Kadous et al. |
| 2007/0097856 | A1 | 5/2007 | Wang et al. |
| 2007/0133707 | A1 | 6/2007 | Hwang et al. |
| 2007/0147543 | A1 | 6/2007 | Horng et al. |
| 2007/0149180 | A1 | 6/2007 | Lin et al. |
| 2007/0165738 | A1 | 7/2007 | Barriac et al. |
| 2007/0189416 | A1 | 8/2007 | Kim et al. |
| 2007/0263746 | A1 | 11/2007 | Son |
| 2007/0280373 | A1 | 12/2007 | Lee et al. |
| 2007/0286302 | A1 | 12/2007 | Hwang et al. |
| 2007/0291638 | A1 | 12/2007 | Chae et al. |
| 2007/0297529 | A1 | 12/2007 | Zhou et al. |
| 2008/0063115 | A1 | 3/2008 | Varadarajan et al. |
| 2008/0069031 | A1 | 3/2008 | Zhang et al. |
| 2008/0080637 | A1 | 4/2008 | Khan et al. |
| 2008/0108310 | A1 | 5/2008 | Tong et al. |
| 2008/0198946 | A1 | 8/2008 | Lee et al. |
| 2008/0205533 | A1 | 8/2008 | Lee et al. |
| 2008/0232503 | A1 | 9/2008 | Kim |
| 2008/0240274 | A1 | 10/2008 | Han et al. |
| 2008/0247364 | A1 | 10/2008 | Kim et al. |
| 2008/0256163 | A1 | 10/2008 | Clerckx et al. |
| 2008/0303699 | A1 | 12/2008 | Zhang et al. |
| 2009/0003466 | A1 | 1/2009 | Taherzadehboroujeni et al. |
| 2009/0003485 | A1 | 1/2009 | Li et al. |
| 2009/0110114 | A1 | 4/2009 | Onggosanusi et al. |
| 2009/0296844 | A1 | 12/2009 | Ihm et al. |
| 2009/0316807 | A1 | 12/2009 | Kim et al. |
| 2010/0027696 | A1 | 2/2010 | Lee et al. |
| 2010/0074309 | A1 | 3/2010 | Lee et al. |
| 2010/0118997 | A1 | 5/2010 | Lee et al. |
| 2011/0150129 | A1 | 6/2011 | Kwon et al. |

FOREIGN PATENT DOCUMENTS

| | | |
|---|---|---|
| EP | 1538772 | 6/2005 |
| EP | 1655874 | 5/2006 |
| JP | 2003018127 | 1/2003 |
| JP | 2005509316 | 4/2005 |
| JP | 2008510417 | 4/2008 |
| JP | 2008528102 | 7/2008 |
| JP | 2009538555 | 11/2009 |
| JP | 2009538556 | 11/2009 |
| KR | 10-2006-0028989 | 4/2006 |
| KR | 10-2006-0038812 | 5/2006 |
| KR | 10-2006-0064501 | 6/2006 |
| KR | 10-2006-0130062 | 12/2006 |
| KR | 10-0715582 | 4/2007 |
| KR | 10-2007-0068300 | 6/2007 |
| KR | 10-2008-0036499 | 4/2008 |
| KR | 10-0918747 | 9/2009 |
| RU | 2238611 | 10/2004 |
| RU | 2005-101422 | 8/2005 |
| RU | 2351071 | 1/2006 |
| RU | 2292116 | 1/2007 |
| WO | 02/39590 | 5/2002 |
| WO | 2004/038952 | 5/2004 |
| WO | 2004064311 | 7/2004 |
| WO | 2004073224 | 8/2004 |
| WO | 2005/099211 | 10/2005 |
| WO | 2005-122516 | 12/2005 |
| WO | 2005/125044 | 12/2005 |
| WO | 2006002550 | 1/2006 |
| WO | 2006/019253 | 2/2006 |
| WO | 2006019250 | 2/2006 |
| WO | 2006049417 | 5/2006 |
| WO | 2006/069271 | 6/2006 |
| WO | 2007/024935 | 3/2007 |
| WO | 2007094832 | 8/2007 |

OTHER PUBLICATIONS

Wang, J., et al.; "Method and Apparatus for Pre-Coding"; U.S. Appl. No. 60/731,301; Oct. 28, 2005.

Collin, "Optimal Minimum Distance-Based Precoder for MIMO Spatial Multiplexing Systems", IEEE Transactions on Signal Processing, Mar. 1, 2004, vol. 52, No. 03, pp. 617-627, XP011107796.

Chan, S. et al., "Asymptotically Minimum BER Linear Block Precoders for MMSE Equalisation", IEEE Proceedings: Communications, Jun. 29, 2004, vol. 151, No. 4, pp. 297-304, XP006022313.

Bauch et al., "Orthogonal Frequency Division Multiple Access with Cycile Delay Diversity", IEEE ITG Workshop on Smart Antennas, pp. 17-24, Mar. 2004.

NTT DoCoMo, "Multi-Degree Cyclic Delay Diversity with Frequency-Domain Channel Dependent Scheduling," R1-062107, 3GPP TSG RAN WG1 Meeting #46, Aug. 2006.

Samsung, "Further Details on Adaptive Cyclic Delay Diversity Scheme," R1-051046, 3GPP TSG RAN WG1 Meeting #42 bis, Oct. 2005.

Samsung, "System Performance of Adaptive Cyclic Delay Diversity (ACDD) Scheme," R1-051047, 3GPP TSG RAN WG1 Meeting #42 bis, Oct. 2005.

NTT DoCoMo, "Multi-Degree Cyclic Delay Diversity with Frequency-Domain Channel Dependent Scheduling," R1-060991, 3GPP TSG RAN WG1 Meeting #44 bis, Mar. 2006.

NTT DoCoMo, "Channel Dependent Scheduling with Cyclic Delay Diversity," R1-061192, 3GPP TSG RAN WG1 Meeting #45, May 2006.

Ericsson, "Phase Shift based Precoding for Downlink MIMO Transmission," R1-071032, 3GPP TSG RAN WG1 Meeting #48, Feb. 2007.

NTT DoCoMo, "CDD-Based Pre-coding Scheme for Rank = 1 and 2," R1-062732, 3GPP TSG RAN WG1 Meeting #46 bis, Oct. 2006.

LG Electronics, "Generalized CDD Scheme for E-UTRA Downlink MIMO," R1-062314, 3GPP TSG RAN WG1 Meeting #46, Aug. 2006.

LG Electronics et al., "CDD-Based Precoding for E-UTRA Downlink MIMO," R1-063345, 3GPP TSG RAN WG1 Meeting #47, Nov. 2006.

LG Electronics, "CDD-Based Precoding for Open-loop E-UTRA Downlink MIMO," R1-063346, 3GPP TSG RAN WG1 Meeting #47, Nov. 2006.

Etri, "Combined Spatial Multiplexing and CSD Transmission for Rate 2 with 4 Transmit Antennas," R1-060824, 3GPP TSG RAN WG1 Meeting #44 bis, Mar. 2006.

Zhang, J., "MIMO Wireless Precoding System Robust to Power Imbalance," U.S. Appl. No. 60/929,025, Jun. 8, 2007.

LG Electronics, "Link Evaluation of DL SU-MIMO—Impact of Generalized CDD," R1-062566, 3GPP TSG RAN WG1 Meeting #46bis, Oct. 2006.

Ericsson, "High Delay CDD in Rank Adapted Spatial Multiplexing Mode for LTE DL," R1-071601, 3GPP TSG RAN WG1 #48bis, Mar. 2007.

Chen et al., "Precoded FIR and Redundant V-BLAST Systems for Frequency-Selective MIMO Channels", IEEE Transactions on Signal Processing, vol. 55, No. 7, p. 3390-3404, Jul. 2007.

Lee et al., "A New Transmit Diversity Scheme based on Cyclic Precoding Vectors for Flat Fading Channels", p. 2238-2242, 2007.

S. Sun et al., "Precoding for Asymmetric MIMO-OFDM Channels", IEEE International Conference on Communications, vol. 7, pp. 3117-3122, Jun. 2006.

Use 2 Antennas Spatial Multiplexing Rate 1

Use 2 Antennas Spatial Multiplexing Rate 2

Use 4 Antennas Spatial Multiplexing Rate 1

Use 4 Antennas Spatial Multiplexing Rate 2

METHOD OF TRANSMITTING USING PHASE SHIFT-BASED PRECODING AND AN APPARATUS FOR IMPLEMENTING THE SAME IN A WIRELESS COMMUNICATION SYSTEM

This application is a divisional application of U.S. application Ser. No. 12/970,168, filed Dec. 16, 2010 (now U.S. Pat. No. 8,135,085), which is a continuation of U.S. application Ser. No. 11/858,082, filed Sep. 19, 2007 now U.S. Pat. No. 7,881,395), which claims the benefit of and right of priority to Korean Application No. P2007-003281, filed on Jan. 11, 2007, and U.S. Provisional Application No. 60/826,143, filed on Sep. 19, 2006, all of which are hereby incorporated by reference in their entireties.

BACKGROUND OF THE INVENTION

1. Field of the Invention

The present invention relates to a method of transmitting, and more particularly, to a method of transmitting using phase shift-based precoding and an apparatus for implementing the same in a wireless communication system.

2. Discussion of the Related Art

With respect to wideband code division multiple access (W-CDMA) systems, researches are being conducted using a multiple antennas to increase system capacity, transmit speed of data, and link reliability by way implementing various schemes such as beamforming, multi-input, multi-output (MIMO), and transmit diversity. In particular, the MIMO scheme promotes high speed transmission via spatial diversity, similar to V-BLAST, is adopted in a $3^{rd}$ Generation Partnership Project (3GPP).

Furthermore, the two (2) antenna system adopted in Release 99 and Release 4, based on transmit diversity, has been improved to a new type of diversity scheme, such as a per antenna rate control (PARC) or a per user unitary rate control (PU2RC), which considers operation using more than three (3) antennas.

FIG. 1A is an exemplary diagram illustrating a structure of a PARC for a single user. FIG. 1B is an exemplary diagram illustrating a structure of a PARC for multiple users.

With respect to conventional V-BLAST, each transmit antenna can be configured using the same modulation and encoding without feedback information from channel quality information (CQI). However, as shown in FIGS. 1A and 1B, the PARC uses the feedback information regarding the channel conditions, such as a modulation coding set (MCS) and/or a transmit antenna subset (TAS), and selects the user data stream to be transmitted by each antenna.

Referring to FIG. 1A, any one of the three (3) user data streams is selected since this is an exemplary illustration the PARC for single user. Referring FIG. 1B, at least two (2) of the three (3) user data streams are selected since this is an exemplary illustration the PARC for multiple users.

Thereafter, the modulation and encoding using the feedback information regarding the channel conditions is applied to the user data streams stored in the buffer after being demultiplexed. The user data streams are then multiplexed using a scheme (e.g., orthogonal frequency division multiple access (OFDMA)) and transmitted via each antenna.

In other words, a base station (BS) applying the PARC scheme uses the feedback information transmitted from a mobile station (MS) to perform scheduling for optimizing transmission rate. Through this, one MS or two or more MSs can simultaneously share frequency and time resources in the space domain. Moreover, the PARC scheme allows for increase in diversity gain as a number of MSs scheduled by the BS increases.

By using the PARC scheme, the feedback overhead is reduced since only the CQI is used as the feedback information. With smaller or reduced overhead, there is relatively less possibility of error during the feedback process, and switching can take place between the PARC for the single user and the PARC for the multiple users. However, in case of the PARC for multiple users, interference between users can occur thus affecting transmission efficiency.

FIG. 2 is an exemplary diagram illustrating a structure of a PU2RC. The PU2RC uses spatial multiplexing for transmitting data streams of multiple users. As such, multiple data streams are selected for transmission to multiple users. In the PU2RC, a unitary matrix based on a singular value decomposition of the MIMO channel is used to perform precoding.

More specifically, the unitary matrix in a transmitter is a set of unitary basic vectors selected by all users (or MSs). If the set of vectors is fixed, represented by M, the unitary basic vectors are selected by one or multiple users.

Furthermore, the PU2RC can be used to reduce inter-user interference and achieve high efficiency gain. However, the feedback information size can be large since information can include preferred matrix index in addition preferred vector in the matrix, thus increasing the possibility of transmission error due to the large size of the feedback information

SUMMARY OF THE INVENTION

Accordingly, the present invention is directed to a method of transmitting using phase shift-based precoding and an apparatus for implementing the same in a wireless communication system that substantially obviates one or more problems due to limitations and disadvantages of the related art.

An object of the present invention is to provide a method of transmitting data using a plurality of subcarriers in a multi-antenna wireless communication system.

Another object of the present invention is to provide a transmitting and receiving device in a multi-user, multi-antenna communication system using a plurality of subcarriers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data using a plurality of subcarriers in a multi-antenna wireless communication system includes receiving feedback information from a mobile station (MS), performing channel encoding and modulation independently on user data to be transmitted by each antenna using the received feedback information, determining a phase shift-based precoding matrix for increasing a phase angle of the user data by a fixed amount, and performing precoding using the determined phase shift-based precoding matrix on the user data.

In another aspect of the present invention, a transmitting and receiving device in a multi-user, multi-antenna communication system using a plurality of subcarriers includes a channel encoder and modulator configured to perform channel coding and modulation independently on user data for each antenna using feedback information from the receiving device, and a first precoder configured to determine a phase shift-based precoding matrix and to perform precoding on the user data using the determined phase shift-based precoding matrix, wherein the phase shift-based precoding matrix is determined based on increasing a phase angle of the user data for each antenna fixedly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The discussions related to the present invention can be applied in various wireless communication systems. The wireless communication system can be used to provide services related to voice, audio, packet data, etc. Moreover, the discussions to follow can be used in downlink as well as uplink transmissions. Here, the downlink transmission refers to transmission from a BS to a MS, and conversely, the uplink transmission refers to transmission from the MS to the BS.

The BS can be generally referred to a fixed station and can also be referred to as Node B, a base transceiver system (BTS), an access point (AP), a network, and a serving station, among other names. The MS can be mobile and/or fixed and can be referred to as a user equipment (UE), a user terminal (UT), a subscriber station (SS), a mobile subscriber station (MSS), a mobile terminal (MT), and a wireless device, among other names.

The discussions related to the present invention can be applied to a single carrier or a multi-carrier communication system. A multi-carrier system can use various modulation schemes, such as an orthogonal frequency division multiplexing (OFDM) and an orthogonal frequency division multiple access (OFDMA). The OFDM/OFDMA is a scheme in which the bandwidths of the entire system are partitioned into a plurality of subcarriers having orthogonality. Here, the sub-carriers can also be referred to as a subband or a tone. Alternatively, the single-carrier system can use various modulation schemes including a single-carrier frequency division multiple access (SC-CDMA) or a code division multiple access (CDMA).

Generally, a communication system comprises a transmitter and a receiver. Here, a unit or a module which can perform the functions of the transmitter and the receiver can be referred to as a transceiver. However, for the purpose of discussing feedback information, the transmitter and the receiver can be independently used.

In the downlink direction, the transmitter can be a part of the BS, and the receiver can be a part of the MS. Alternatively, the transmitter can be a part of the MS while the receiver can be a part of the BS. The BS can include a plurality of transmitters and/or receivers. Similarly, the MS can include a plurality of transmitters and/or receivers.

Embodiment #1

This embodiment relates to optimizing the transmission efficiency by independently configuring modulation and encoding of each transmission antenna in a multi-user, multi-antenna system. Here, a phase shift-based precoding can be applied to minimize or reduce interference between users.

Figure 1A:
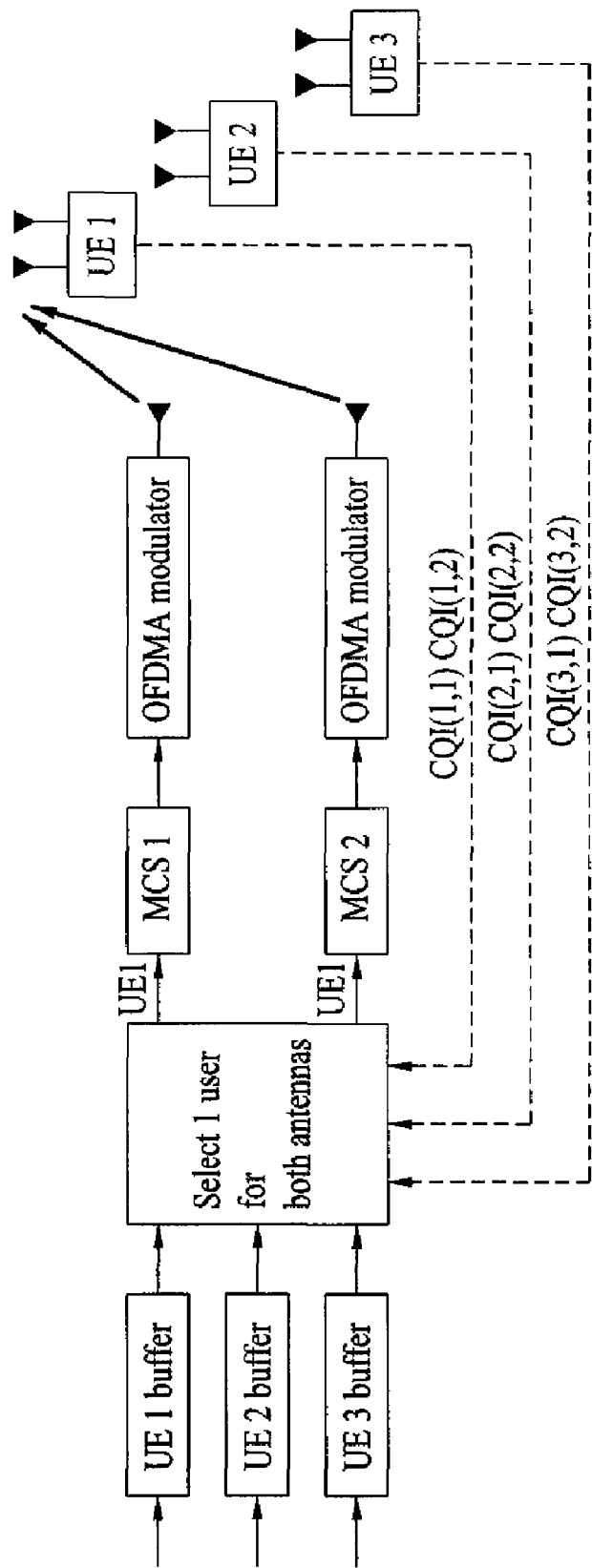
FIG. 1A is an exemplary diagram illustrating a structure of a PARC for a single user.
Figure 1B:
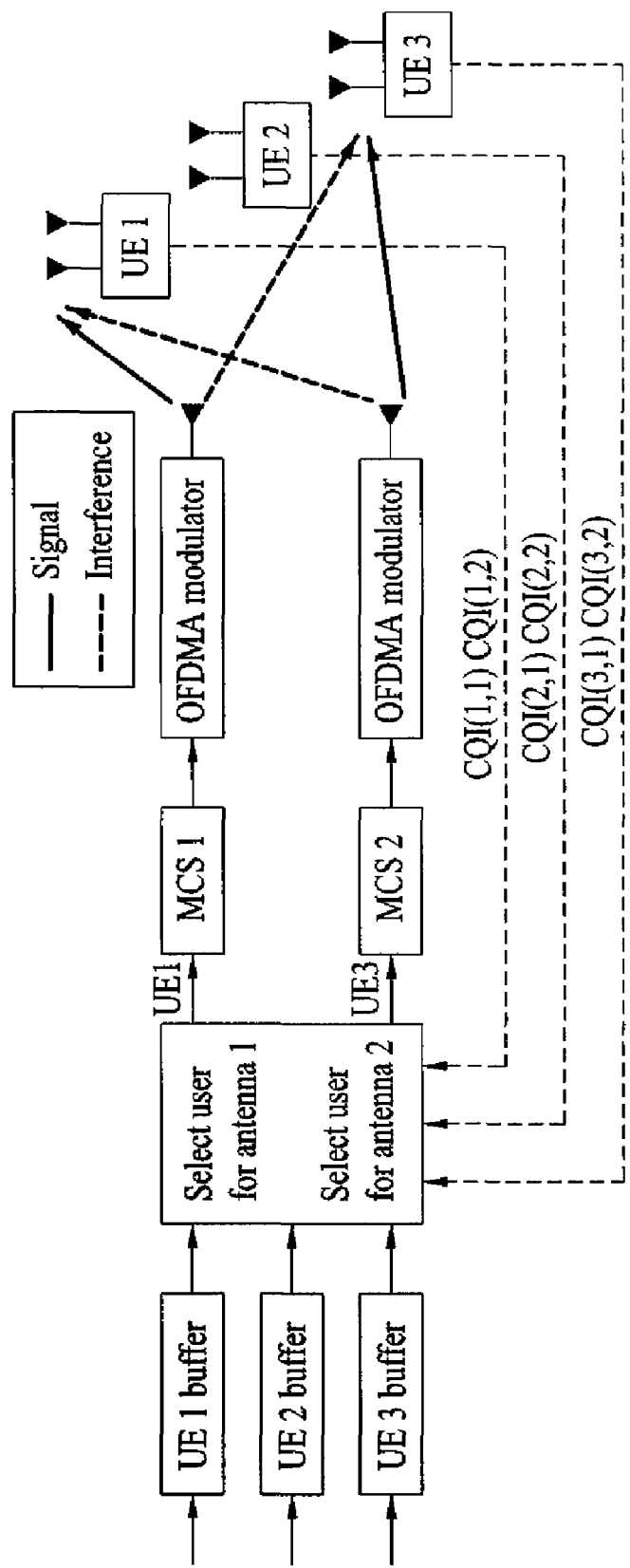
FIG. 1B is an exemplary diagram illustrating a structure of a PARC for multiple users.
Figure 2:
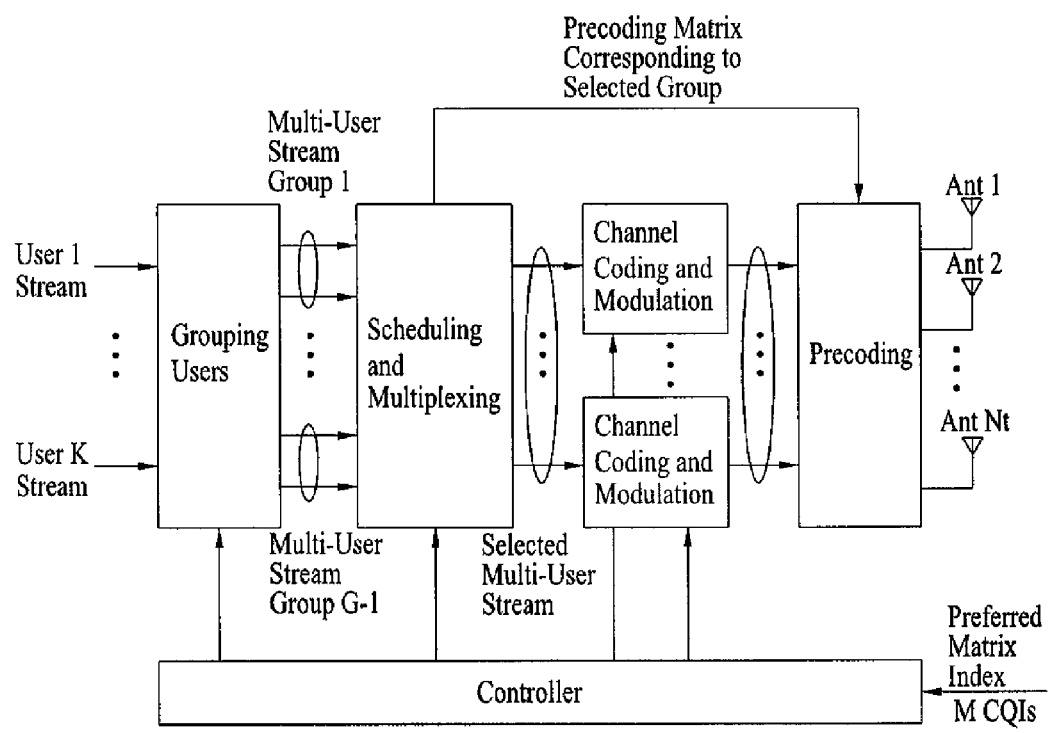
FIG. 2 is an exemplary diagram illustrating a structure of a PU2RC.
Figure 3A:
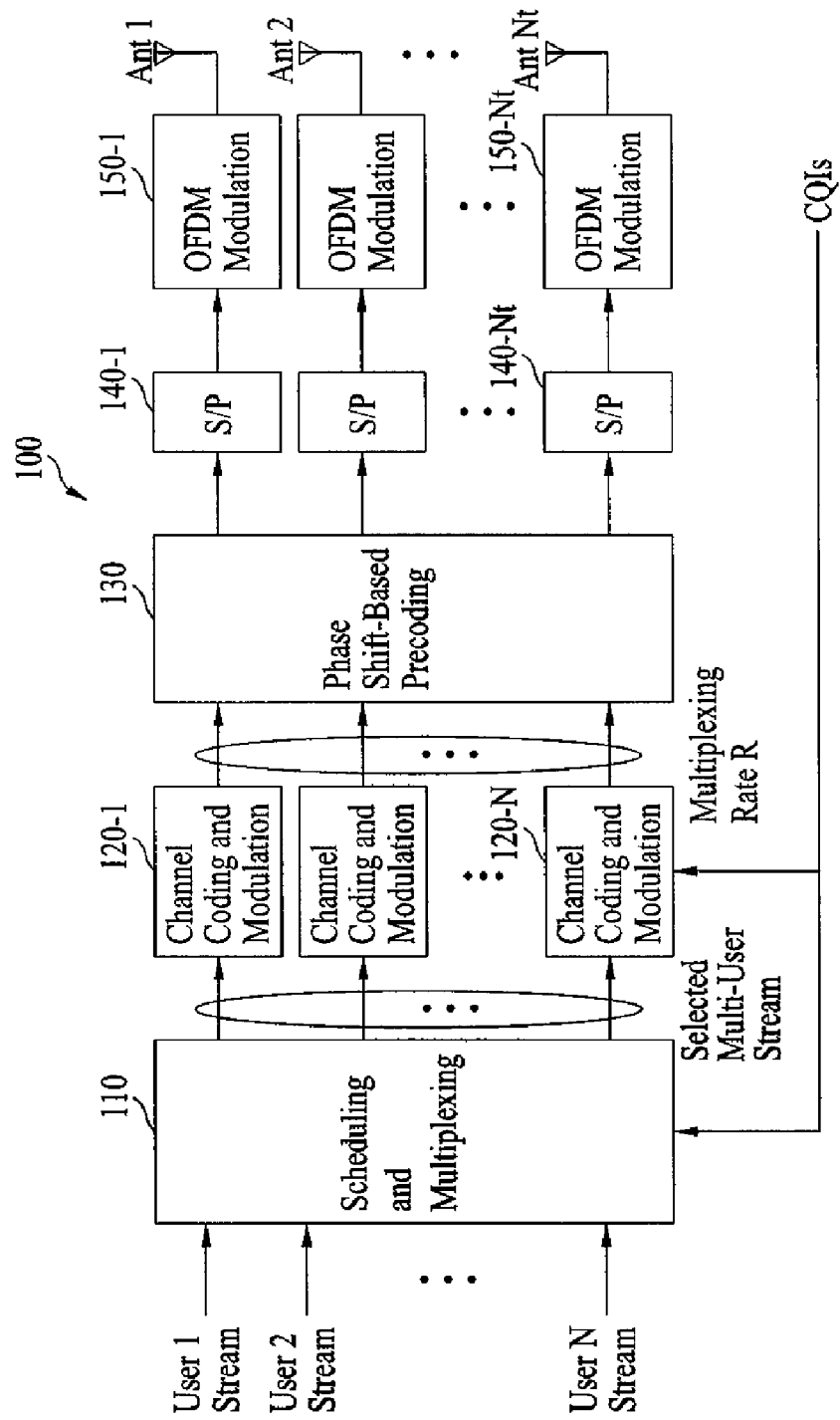
FIG. 3A is an exemplary diagram illustrating a transmitter of a communication system according to Embodiment #1.

FIG. 3A is an exemplary diagram illustrating a transmitter of a communication system according to Embodiment #1. Referring to FIG. 3A, the transmitter 100 comprises a scheduler/multiplexer 110, a plurality of channel encoders/modulators (120-1~120-N), a precoder 130, a plurality of serial/parallel (SP) converters (140-1~140-$N_t$), a plurality of modulators (150-1~150-$N_t$).

Figure 3B:
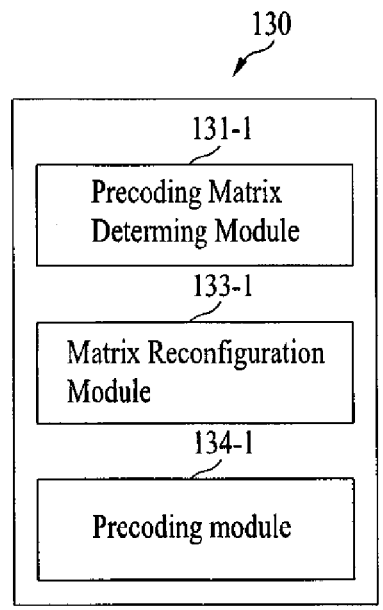
FIGS. 3B and 3C are exemplary diagrams illustrating processes or procedures of the precoder of the transmitter of FIG. 3A.
Figure 3C:
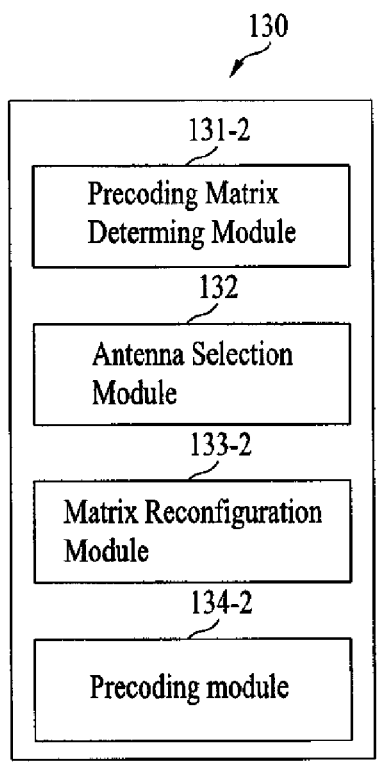

FIGS. 3B and 3C are exemplary diagrams illustrating processes or procedures of the precoder of the transmitter of FIG. 3A.

In FIG. 3A, the scheduler/multiplexer 110 can be configured to schedule the user (or the MS) when the streams of information bits are inputted by each user. From the scheduled users, the actual user for transmission can be selected, and the selected information bits can be multiplexed.

The plurality of channel encoders/modulators (120-1~120-N) can be configured to output coded data by encoding the multiplexed information bits according to a prescribed coding scheme(s). Thereafter, the coded data can be modulated using a prescribed modulation scheme. The information bits can include text, audio, video, or other types of data.

Furthermore, the plurality of channel encoders/modulators (120-1~120-N) can attach or add an error detection bits (e.g., cyclic redundancy check (CRC)) to the information bits and further add extra codes for error correction. The error correction codes include a turbo code, a low density parity check code (LDPC), and a convolution code, among other various error correction codes.

The plurality of channel encoders/modulators (120-1~120-N) can be configured to map (or allocate) the coded data to symbols on an amplitude and phase constellation. The modulation schemes that can be applied are not limited and can vary, and these schemes can be an m-quadrature phase shift keying (m-PSK) scheme or a m-quadrature amplitude modulation (m-QAM) scheme. For example, the m-PSK scheme includes a binary phase shift keying (BPSK), a quadrature phase shift keying (QPSK), or an 8-PSK. Moreover, the m-QAM includes a 16-QAM, a 64-QAM, or a 256-QAM.

The precoder 130 can be configured to apply phase shift-based precoding to the mapped symbols. Here, the precoder 130 can output a transmit symbol which is a set of symbols transmitted during one transmission period or one time slot. The details of the phase shift-based precoding performed by the precoder 130 will be discussed later.

The plurality of S/P converters (140-1~140-$N_t$) can be configured to output the precoded transmit symbols in parallel to the plurality of modulators (150-1~150-$N_t$). The plurality of modulators (150-1~150-$N_t$) can be configured to modulate each transmit symbols from the S/P converters (140-1~140-$N_t$) according to a multiple access modulation scheme. The multiple access modulation schemes that can be applied are not limited, and these schemes can be a single-carrier modulation scheme (e.g., CDMA) or a multi-carrier modulation scheme (e.g., OFDMA).

Discussed below is a phase shift-based precoding scheme applied in a two-antenna system and/or a four-antenna system using OFDM multi-carrier modulation scheme. Further, the discussions relate to application of the phase shift-based precoding to a multi-antenna system having $N_t$ number of antennas. More specifically, the discussions may be based on a structure of a generalized phase shift-based precoding matrix which can be applied to enhancing the multi-antenna system having $N_t$ number of antennas.

Phase Shift-Based Precoding Scheme

Figure 4:
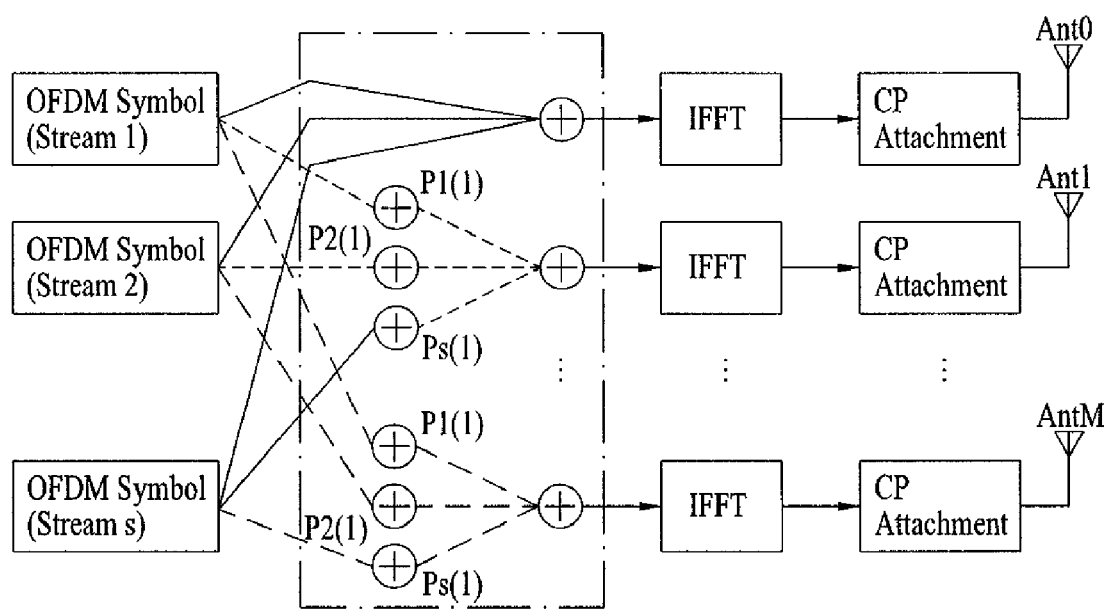
FIG. 4 is an exemplary diagram illustrating phase shift-based precoding.

FIG. 4 is an exemplary diagram illustrating phase shift-based precoding. The phase shift-based precoding can be defined as a scheme by which the data streams are transmitted via all the antennas but with different (or independent) phase sequence multiplied thereto. Generally, if a small cyclic delay can be used to generate a phase sequence, a frequency selection of a channel is provided from the perspective of the receiver (e.g., MS), and the size of the channel can increase or decrease depending on the frequency domain.

Figure 5:
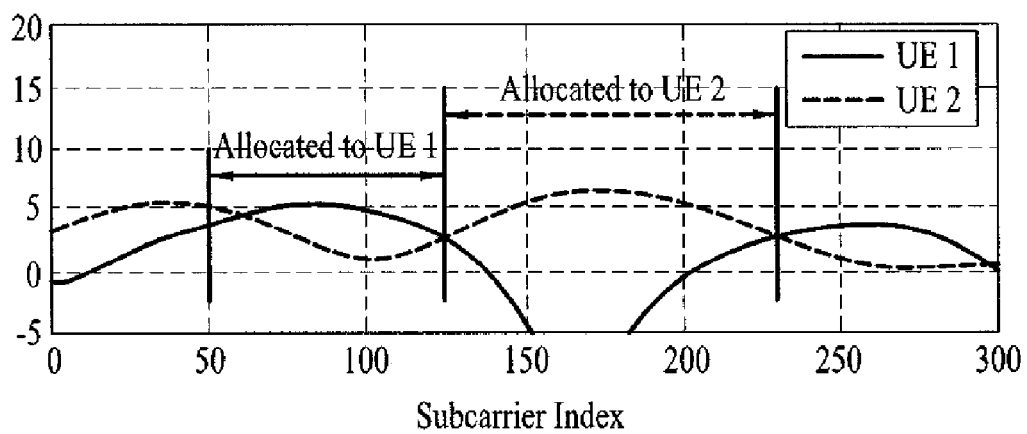
FIG. 5 is an exemplary diagram illustrating change in channel size as a result of cyclic delay.
Figure 5:
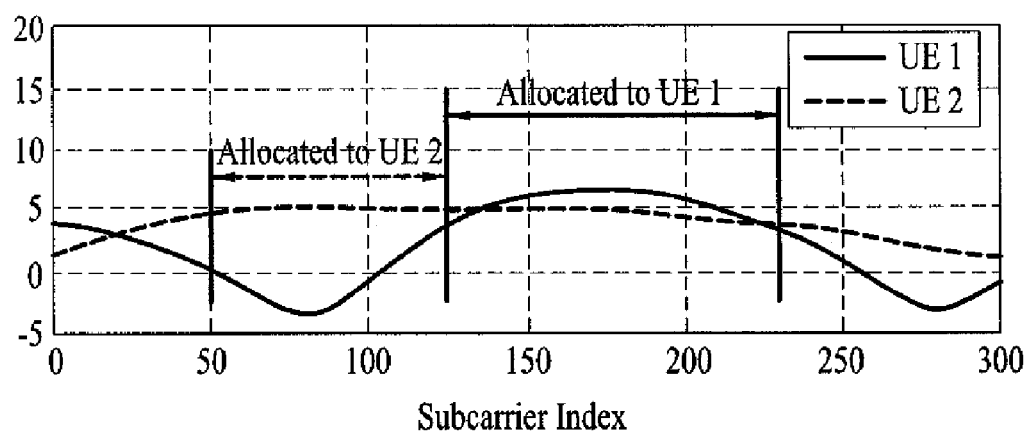

FIG. 5 is an exemplary diagram illustrating change in channel size as a result of cyclic delay. Referring to FIG. 5, the transmitter 100 can achieve frequency diversity by allocating users (or MSs) to parts of the frequency whose channel condition improves due to increase in frequency of the frequency domain. Here, certain parts of the frequency domain has a large frequency bandwidth and is less affected by fluctuations caused by relative small cyclic delay values. In order to apply cyclic delay values which increases or decreases uniformly to each antenna, the phase shift-based precoding matrix, P, can be used as expressed as in Equation 1.

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix} \quad \text{[Equation 1]}$$

Referring to Equation 1, k denotes index of subcarriers or frequency resource index in which a specific frequency bandwidth is allocated for each resource, and $w^k_{i,j}$ (i=1..., $N_t$, j=1, 1, ..., R) denotes a complex weight determined according to k. Moreover, $N_t$ denotes a number of transmit antennas or virtual antennas (e.g., a number of spatial multiplexing rate) while R denotes spatial multiplexing rate. Here, the complex weight value can be variable according to the index of the OFDM symbols and corresponding subcarriers multiplied to antennas. In addition, the complex weight value can be determined by channel condition and/or feedback information. Preferably, the precoding matrix, P, of Equation 1 is configured using a unitary matrix so as to reduce loss in channel capacity of a multi-antenna system.

The following equation can be used to express a channel capacity of a multi-antenna open-loop system so as to define the elements (or components) of the unitary matrix.

$$Cu(H) = \log_2\left(\det\left(I_{N_r} + \frac{SNR}{N}HH^H\right)\right) \quad \text{[Equation 2]}$$

Referring to Equation 2, H denotes a multi-antenna channel matrix having a size of $N_r \times N_t$, and $N_r$ denotes a number of receiving antennas. If Equation 2 is applied to the phase shift-based precoding matrix P, the result can be expressed as shown in Equation 3.

$$C_{precoding} = \log_2\left(\det\left(I_{N_r} + \frac{SNR}{N}HPP^H H^H\right)\right) \quad \text{[Equation 3]}$$

Referring to Equation 3, in order to minimize or eliminate channel capacity loss, $PP^H$ must be an identity matrix. As such, the phase shift-based matrix P has to satisfy the following condition of Equation 4.

$$PP^H = I_N \quad \text{[Equation 4]}$$

In order for the phase shift-based precoding matrix P to be converted to an identity matrix, two (2) conditions need to be satisfied. That is, a power limitation condition and orthogonality limitation condition need to be met simultaneously. The power limitation condition relates to making the size of each column of the matrix to equal 1. Moreover, the orthogonality limitation condition relates to making each column orthogonal (or the columns are orthogonal to each other). Equation 5 and Equation 6 are examples of these.

$$|w_{1,1}^k|^2 + |w_{2,1}^k|^2 + \ldots + |w_{N_t,1}^k|^2 = 1,$$
$$|w_{1,2}^k|^2 + |w_{2,2}^k|^2 + \ldots + |w_{N_t,2}^k|^2 = 1,$$
$$\vdots$$
$$|w_{1,R}^k|^2 + |w_{2,R}^k|^2 + \ldots + |w_{N_t,R}^k|^2 = 1 \qquad \text{[Equation 5]}$$

$$w_{1,1}^{k*}w_{1,2}^k + w_{2,1}^{k*}w_{2,2}^k + \ldots + w_{N_t,1}^{k*}w_{N_t,2}^k = 0,$$
$$w_{1,1}^{k*}w_{1,3}^k + w_{2,1}^{k*}w_{2,3}^k + \ldots + w_{N_t,1}^{k*}w_{N_t,3}^k = 0,$$
$$\vdots$$
$$w_{1,1}^{k*}w_{1,R}^k + w_{2,1}^{k*}w_{2,R}^k + \ldots + w_{N_t,1}^{k*}w_{N_t,R}^k = 0 \qquad \text{[Equation 6]}$$

The discussions above with respect to Equations 2-6 relate to a unitary matrix. Hereafter, the discussions of the unitary matrix relate to a phase shift-based precoding matrix having a 2×2 matrix size.

Equation 7 represents a general phase shift-based precoding matrix applied in a system having a spatial multiplexing rate of 2 and two (2) transmit antennas.

$$P_{2\times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix} \qquad \text{[Equation 7]}$$

Referring to Equation 7, $\alpha_i, \beta_i$ (i=1, 2) represents real numbers, $\theta_i$ (i=1, 2, 3, 4) denotes a phase value, and k denotes subcarrier index or resource index of OFDM signals.

In order to convert such a precoding matrix (e.g., Equation 7) into a unit matrix, the power limitation condition of Equation 8 and the orthogonality limitation condition of Equation 9 need to be satisfied.

$$|\alpha_1 e^{jk\theta_1}|^2 + |\beta_2 e^{jk\theta_3}|^2 = 1, |\alpha_2 e^{jk\theta_4}|^2 + |\beta_1 e^{jk\theta_2}|^2 = 1 \qquad \text{[Equation 8]}$$

$$(\alpha_1 e^{jk\theta_1})^* + \beta_1 e^{jk\theta_2} = 1 + (\beta_2 e^{jk\theta_3})^* + \alpha_2 e^{jk\theta_4} = 0 \qquad \text{[Equation 9]}$$

In Equations 8 and 9, * denotes a conjugate complex number. If the phase shift-based precoding matrix having a size of 2×2 satisfies Equations 7-9, such a matrix can be expressed as follows as shown in Equation 10.

$$p_{2\times 2}^k = \frac{1}{\sqrt{2}} \begin{pmatrix} 1 & e^{jk\theta_2} \\ e^{jk\theta_3} & 1 \end{pmatrix} \qquad \text{[Equation 10]}$$

Referring to Equation 10, $\theta_2$ and $\theta_3$ maintain an orthogonal relationship based on satisfying the orthogonality limitation condition. This can be expressed as shown in Equation 11.

$$k\theta_3 = -k\theta_2 + \pi \qquad \text{[Equation 11]}$$

The precoding matrix can be stored in the transmitter and the receiver in a form of a codebook. The codebook can include various precoding matrix generated using a specified number of different $\theta_2$ values. Here, $\theta_2$ value can be configured based on the channel conditions and whether feedback information is provided or not. If the feedback information is provided (or used), $\theta_2$ value can be configured to be a small value. If the feedback information is not provided (or not used), $\theta_2$ value can be configured to be a large value so as to attain high frequency diversity gain.

Even if the phase shift-based matrix is generated, similar to Equation 7, the multiplexing rate R may have to be set low in view of actual number of antennas due to the channel condition. In such a case, a specified number of columns corresponding to a current spatial multiplexing rate (e.g., reduced spatial multiplexing rate) from the generated phase shift-based precoding matrix can be selected to reconfigure the phase shift-based precoding matrix. In other words, a new precoding matrix to be applied to the corresponding system is not generated each time the spatial multiplexing rate is changed. Rather, the initial (or first generated) phase shift-based precoding matrix can continue to be used, and a specified column of the corresponding precoding matrix can be selected to reconfigure the precoding matrix.

For example, referring to Equation 10, the multi-antenna communication system comprises two (2) transmit antennas, and the spatial multiplexing rate is 2. However, the spatial multiplexing rate can change and can be reduced to 1. In such a case, a column from the precoding matrix of Equation 10 can be selected and the selected column can be used for precoding.

For example, if a second column is selected, the phase shift-based precoding matrix can be expressed as shown in Equation 12. Moreover, this form of equation is analogous to the form where cyclic delay diversity scheme is applied in a two (2) transmit antenna system.

$$P_{2\times 1}^k = \frac{1}{\sqrt{2}} \begin{pmatrix} e^{jk\theta_2} \\ 1 \end{pmatrix} \qquad \text{[Equation 12]}$$

Equation 12 an exemplary illustration associated with a system having two (2) transmit antennas. However, this equation can also be applied to a system having four (4) transmit antennas. In other words, in a four (4) transmit antenna system, after the phase shift-based precoding matrix is generated, a specified column can be selected in accordance with the changing spatial multiplexing rate (e.g., spatial multiplexing rate from 2 to 1), and the selected specified column can be used for precoding.

Figure 6:
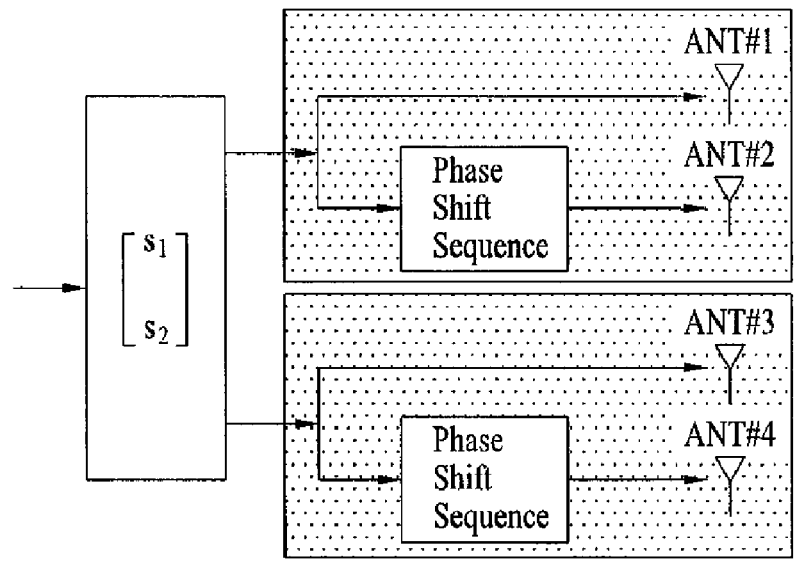
FIG. 6 is an exemplary diagram illustrating a multiple antenna system, having four (4) transmit antennas and the spatial multiplexing rate of 2, to which a conventional spatial multiplexing and cyclic delay diversity schemes are applied.

FIG. 6 is an exemplary diagram illustrating a multiple antenna system, having four (4) transmit antennas and the spatial multiplexing rate of 2, to which a conventional spatial multiplexing and cyclic delay diversity schemes are applied.

Figure 7:
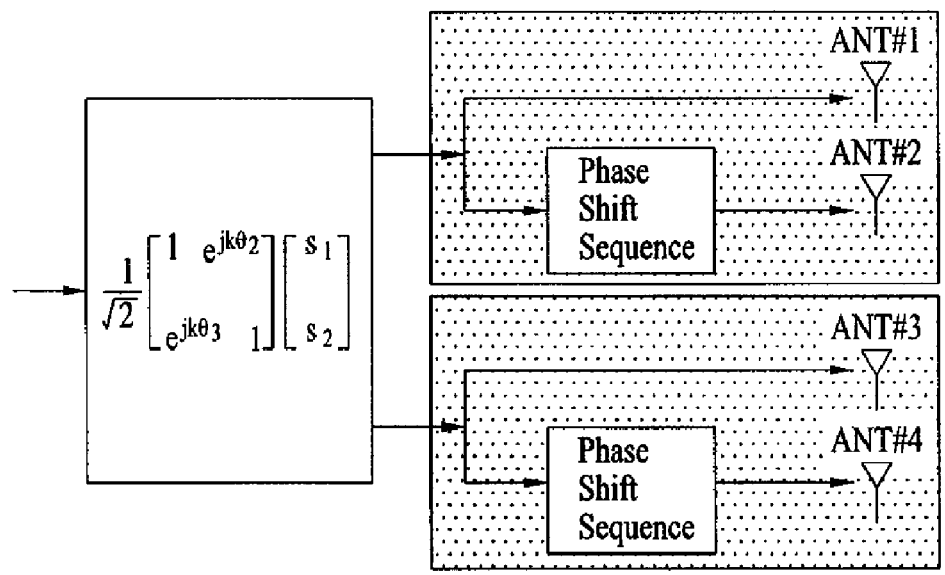
FIG. 7 is an exemplary diagram of a multiple antenna system to which the phase shift-based precoding matrix of Equation 10 is applied.

FIG. 7 is an exemplary diagram of a multiple antenna system to which the phase shift-based precoding matrix of Equation 10 is applied.

Referring to FIG. 6, a first sequence $S_1$ and a second sequence $S_2$ are sent to a first antenna (e.g., ANT #1) and a third antenna (e.g., ANT #3), respectively. Moreover, a phase shifted first sequence ($s_1 e^{j\theta_1}$) and a phase shifted second sequence ($s_2 e^{j\theta_1}$) are sent to a second antenna (e.g., ANT #2) and a fourth antenna (e.g., ANT #4), respectively. Based on such arrangement, it is evident that the spatial multiplexing rate is 2.

Referring to FIG. 7, a sequence $s_1 + s_2 e^{jk\theta_2}$ is sent to the first antenna (e.g., ANT #1), a sequence $s_1 e^{jk\theta_3} + s_2$ is sent to the third antenna (e.g., ANT #3), a sequence $s_1 e^{jk\theta_1} + s_2 e^{jk(\theta_1+\theta_2)}$ is sent to the second antenna (e.g., ANT #2), and a sequence $s_1 e^{jk(\theta_1+\theta_1)} s_2 e^{jk\theta_1}$ is sent to the fourth antenna (e.g., ANT #4).

Compared to the system of FIG. 6, the system of FIG. 7 uses a unitary precoding matrix to perform cyclic delay (or phase shift) on four (4) antennas so as to take advantage of the cyclic delay diversity scheme.

The phase shift-based precoding matrix per spatial multiplexing rate in a two (2) antenna system and a four (4) antenna system can be organized as follows.

TABLE 1

| Two-Antenna System | | Four-Antenna System | |
|---|---|---|---|
| Spatial Multiplexing Rate 1 | Spatial Multiplexing Rate 2 | Spatial Multiplexing Rate 1 | Spatial Multiplexing Rate 2 |
| $\frac{1}{\sqrt{2}}\begin{pmatrix} 1 \\ e^{j\theta_1 k} \end{pmatrix}$ | $\frac{1}{\sqrt{2}}\begin{pmatrix} 1 & -e^{-j\theta_1 k} \\ e^{j\theta_1 k} & 1 \end{pmatrix}$ | $\frac{1}{\sqrt{4}}\begin{pmatrix} 1 \\ e^{j\theta_1 k} \\ e^{j\theta_2 k} \\ e^{j\theta_3 k} \end{pmatrix}$ | $\frac{1}{\sqrt{4}}\begin{pmatrix} 1 & -e^{-j\theta_1 k} \\ e^{j\theta_1 k} & 1 \\ e^{j\theta_2 k} & -e^{-j\theta_3 k} \\ e^{j\theta_3 k} & -e^{-j\theta_2 k} \end{pmatrix}$ |

Figure 8:
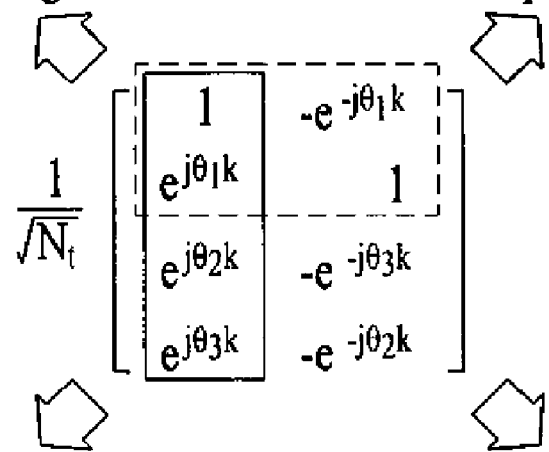
FIG. 8 is an exemplary diagram of a four-antenna system where a specific part of the precoding matrix is selected.

Referring to Table 1, $\theta_i$ (i=1, 2, 3) denotes cyclic delay values according to the phase angles, and k denotes an index of OFDM subcarriers or resource index. Each of the four (4) types of precoding matrices shown in Table 1 can be acquired by selecting a specific part of the precoding matrix from the four (4) antenna system having the spatial multiplexing rate of 2. This is illustrated in FIG. 8 which is an exemplary diagram of a four-antenna system where a specific part of the precoding matrix is selected.

In addition, the storage or memory of the transmitter and the receiver can be conserved since each of the four (4) precoding matrix, as shown in Table 1, does not need to be separately or independently provided in the codebook. Further, the phase shift-based precoding matrix, as discussed above, can be applied to a system having M number of antennas with the multiplexing rate of N (N≦M) based on the same logic.

A First Precoder for Implementing Phase Shift-Based Precoding Scheme

The first precoder 130 comprises a precoding matrix generation module 131-1, a matrix reconfiguration module 133-1, and a precoding module 134-1. More specifically, the precoding matrix generation module 131-1 can be configured to determine a reference row corresponding to a first subcarrier from a prescribed precoding matrix, and to perform phase shift to determine remaining rows. Here, phase shifting is based on increasing the phase angle of the reference row by a constant or uniform amount.

In the present invention, the precoding can be performed using a unitary matrix having a specified size (e.g., (number of transmit antennas)×(spatial multiplexing rate)). The unitary matrix can be provided to index of each subcarrier or index resource, and the unitary matrix for the first index can be phase shifted so that the unitary matrix for the rest of the indices can be determined The precoding matrix generation module 131-1 can select an arbitrary first precoding matrix from the codebook stored in the memory. The second precoding matrix for the subcarriers of the second index can be generated by applying a small phase shift to the first precoding matrix. Here, the amount of phase shift can be determined based on the channel condition and/or whether feedback information is received or not.

Moreover, the third precoding matrix for the subcarriers of the third index can be generated by applying a small phase shift to the second precoding matrix. Similarly, the rest of the precoding matrices up to the last precoding matrix can be generated according to the processes described above.

The matrix reconfiguration module 133-1 can be configured to select a specified number of columns corresponding to the spatial multiplexing rate (e.g., 1 or 2) of each precoding matrix generated from the precoding matrix generation module 131-1, and to discard remaining (or non-selected) columns in reconfiguring the precoding matrix. Here, precoding matrix can be generated based on only the selected column. Furthermore, an arbitrary column can be selected as the specified column from the precoding matrix, or the specific column can be selected according to a prescribed scheme.

Lastly, the precoding module 134-1 can be configured to perform precoding by substituting or assigning OFDM symbols corresponding to the subcarriers to each of the determined precoding matrix.

A Generalized Phase Shift-Based Precoding Scheme

The discussion of above with respect to configuring a phase shift-based precoding matrix was based on a system having four (4) transmit antennas and a spatial multiplexing rate or 2. As mentioned above, the discussion of above can also be applied to a system having $N_t$ number of antennas ($N_1$ greater than or equal to 2 and is a natural number) and the spatial multiplexing rate is R (R>1 and is a natural number). Such an application can be implemented using the processes described above or can generalized using Equation 13.

$$P^k_{N_t \times R} = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix} U_{N_t \times R} \quad \text{[Equation 13]}$$

Referring to Equation 13, the matrix to the right of the equal sign ('=') represents a unitary matrix for phase shift, and the matrix U is a unitary matrix for a specific purpose which satisfies $\mathbb{U}_{N_t \times R}^H \times \mathbb{U}_{n_t \times R} = \mathbb{I}_{R \times R}$.

Further, if a system has two (2) transmit antennas and uses a 1-bit codebook, the phase shift-based precoding matrix can be expressed as shown in Equation 14.

$$P^k_{2 \times 2} = \left( \begin{array}{|c|c|} \hline \alpha & \beta \\ \hline \beta & -\alpha \\ \hline \end{array} \right), \quad \alpha^2 + \beta^2 = 1 \quad \text{[Equation 14]}$$

Multiplexing Rate = 1  Multiplexing Rate = 2

Referring to Equation 14, since β can be determined relatively easily once α is determined, α can be pre-set with two (2) values and the information regarding the pre-set values can be fed back in form of codebook index. For example, if the feedback codebook index is 0, α can be 0.2, and if the feedback codebook index is 1, then α can be 0.8. Such values can be predetermined and shared between the transmitter and the receiver. In addition, each column can be allocated to different user(s).

As an example of the matrix U, a prescribed precoding matrix can be used to achieve signal-to-noise (SNR) diversity gain. To this end, if a Walsh code is used, the phase shift-based precoding matrix P can be expressed as shown in Equation 15.

$$P_{4\times4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad [\text{Equation 15}]$$

Referring to Equation 15, this is based on a system having four (4) transmit antennas and a spatial multiplexing rate of 4. Here, the second matrix to the right of the equal sign (e.g., represented in 1s and −1s) can be reconfigured to select a specific antenna (e.g., antenna selection) and/or adjust spatial multiplexing rate (e.g., rate tuning)

Equation 16 represents reconfigured unit matrix for selecting two (2) antennas in a system having four (4) transmit or virtual antennas.

$$P_{4\times4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 0 & 0 & 1 & 1 \\ 0 & 0 & 1 & -1 \\ 1 & 1 & 0 & 0 \\ 1 & -1 & 0 & 0 \end{pmatrix} \quad [\text{Equation 16}]$$

As discussed, the spatial multiplexing rate can change or vary due to various factors including affects in time and/or channel conditions. The following Table 2 shows a method for reconfiguring the second matrix to the right of the equal sign (e.g., represented by 0s, 1s, and −1s) to correspond to the changed (or changing) spatial multiplexing rate.

TABLE 2

$$P_{4\times4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Multiplexing Rate 1  Multiplexing Rate 4

Multiplexing Rate 2

Referring to Table 2, the first column, the first and second columns, and/or first through fourth columns are selected according to the multiplexing rate (e.g., multiplexing rate of 1, 2, or 4). However, the multiplexing rate (or selection of columns) is not limited to the example of Table 2, but the multiplexing rate can be one (1) and any one of the four columns can be selected. Moreover, if the multiplexing rate is two (2), any two columns of the four columns (e.g., 1-2, 2-3, 3-4, or 4-1) can be selected.

Further, one or more column(s) in the matrix in Table 2 can be allocated to different user(s) in order to share spatial domain resource(s).

In addition, the second matrix can be provided to the transmitter and the receiver in a form of a codebook. In such a case, the transmitter can receive the index information of the codebook from the receiver. Thereafter, the transmitter can select a unitary matrix (e.g., the second matrix) of the corresponding index from the codebook and use Equation 13 to configure the phase shift-based precoding matrix.

Furthermore, the cyclic delay value for phase shift-based precoding matrix can be a value that is predetermined at the transmitter and the receiver. Alternatively, this value can be a value that is provided to the transmitter via the feedback information. Moreover, the spatial multiplexing rate R can be a predetermined value at the transmitter and the receiver. However, the spatial multiplexing rate R can be provided as feedback information by the receiver to the transmitter after the receiver calculates the spatial multiplexing rate upon periodically measuring the channel conditions. Here, the transmitter can use the channel information fed back from the receiver to calculate and/or manipulate the spatial multiplexing rate.

For additional description and/or more details regarding the discussions related to the embodiments of the present invention, Korean Application No. 2006-97216, filed on Oct. 2, 2006, and Korean Application No. 2007-37008, filed on Apr. 16, 2007, can be referred to, which are hereby incorporated by reference.

A First Precoder for Implementing a Generalized Phase Shift-Based Precoding Scheme A first precoder 130 comprises a precoding matrix determining module 131-2, an antenna selection module 132, a matrix reconfiguration module 133-2, and a precoding module 134-2.

More specifically, the precoding matrix determining module 131-2 can be configured to determine a phase shift-based precoding matrix by multiplying the second matrix which satisfies the conditions associated with the first matrix (e.g., Equation 13) and the unitary matrix.

The antenna selection module 132 can be configured to select at least one partial matrix having a size of n×n (0<n<N) corresponding to a specific antenna from the second matrix (e.g., Equation 16), and select a specific antenna to be used for data transmission by configuring all elements other than the selected element to zero (0). Here, the selected element.

The matrix reconfiguration module 133-2 can be configured to select a number of columns corresponding to the spatial multiplexing rate of the second matrix (e.g., Table 2) and to reconfigure the second matrix using only the selected columns.

Although not described above, there are other components of the transmitter which may be necessary for operation. Such as, for example, a memory (not shown) can be used to store various information, a receiver circuit (not shown) can be used to receive feedback information, and a controller (not shown) can be used to control various components of the transmitter.

In detail, the memory can store a codebook for the phase shift-based precoding matrix and/or a modulation and coding scheme (MCS) lookup table for supporting adaptive channel coding and modulation (AMC) scheme. The codebook can include at least one item associated with the phase shift-based precoding matrix and at least one item associated with each matrix index. Moreover, the MCS lookup table can include at least one item associated with coding rate to be applied to the inputted information bits, at least one item associated with modulation scheme, and at least one item associated with MCS level index.

The receiver circuit can receive the transmitted signals from the receiver via the antenna, converts the received signals into digital signal, and send the digitally converted signals to the controller. The received signals can include information such as channel quality information (CQI). The CQI can be included in feedback information and can be used to provide information related to channel condition, coding scheme(s), and/or modulation scheme(s). More specifically, the CQI can be associated with index for the phase shift-based precoding matrix, index for a specific coding rate and/or modulation scheme or modulation size. As index information, the MCS level index can be used.

Embodiment #2

In another embodiment of the present invention, precoding based on a codebook can be used to schedule transmit power more efficiently so as to increase transmit reliability as well as transmit throughput. Moreover, such a method can be implement in a transmitter and a receiver.

Figure 9:
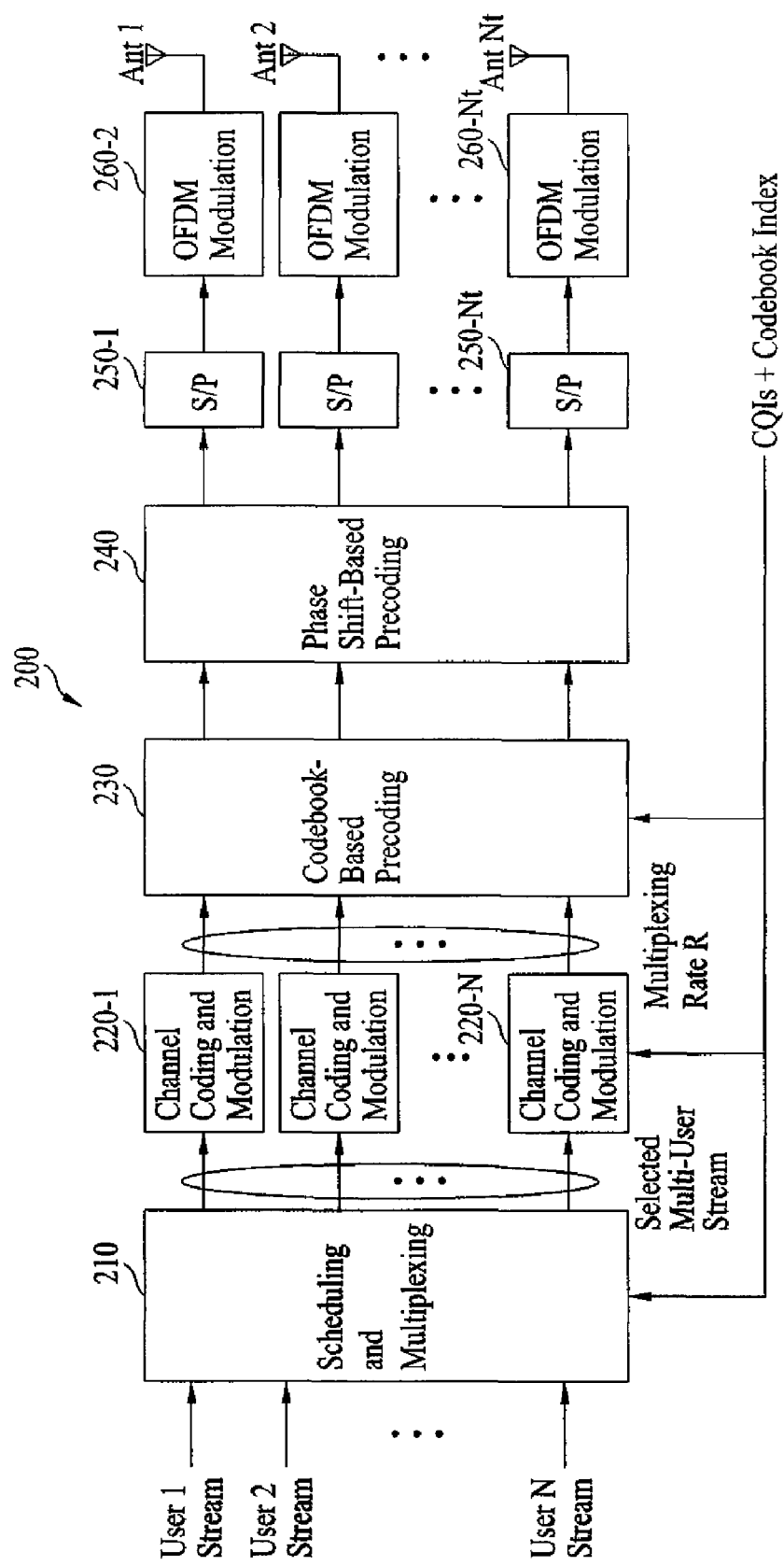
FIG. 9 is an exemplary diagram illustrating a transmitter according to the Embodiment #2.

FIG. 9 is an exemplary diagram illustrating a transmitter according to the Embodiment #2. Referring to Embodiment #1, the transmitter 100 comprises a scheduler/multiplexer 110, a plurality of channel encoders/modulators (120-1~120-N), a precoder 130, a plurality of serial/parallel (SP) converters (140-1~140-$N_t$), a plurality of modulators (150-1~150-$N_t$).

Referring to FIG. 9, the transmitter 200 comprises a scheduler/multiplexer 210, a plurality of channel encoders/modulators (220-1~220-N), a precoder 240, a plurality of serial/parallel (SP) converters (250-1~250-$N_t$), a plurality of modulators (260-1~260-$N_t$). In addition, a precoder based on codebook 230 is further included.

In order to distinguish codebook-based precoding performed by the precoder 240 from the phase shift-based precoding performed by the precoder 130 (referred to as Precoding #1), the codebook-based precoding will be referred to as Precoding #2. Precoding #2 relates to a scheme by which SNR gain can be achieved by receiving as feedback from the receiver an index of the precoding matrix, known to both the transmitter and the receiver.

Figure 10:
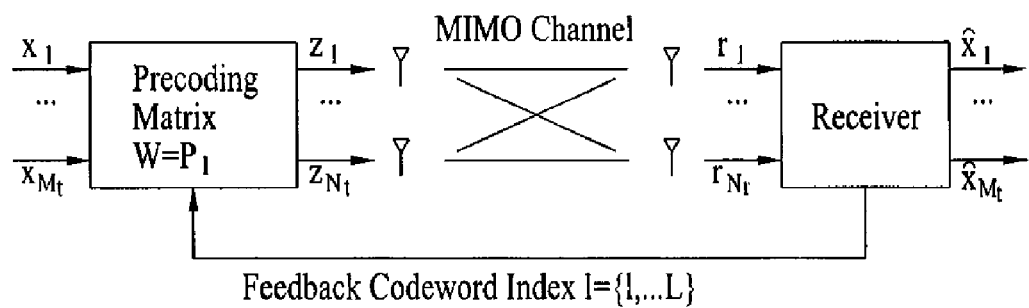
FIG. 10 is an exemplary diagram illustrating a process of a transmitter and a receiver in a multi-antenna system which supports codebook-based precoding.

FIG. 10 is an exemplary diagram illustrating a process of a transmitter and a receiver in a multi-antenna system which supports codebook-based precoding. Referring to FIG. 10, the transmitter and the receiver each have a fixed precoding matrix ($P_1$~$P_L$). The receiver can use the channel information to transmit as feedback to the transmitter an optimum precoding matrix index 1. After receiving the feedback information, the precoder 240 of the transmitter can then apply the precoding matrix corresponding to the index to the transmit data ($X_1$~$X_{Mt}$).

Table 3 shows an example of a codebook that can be applied in a system having two (2) transmit antennas with the spatial multiplexing rate of 2, and the system uses 3-bit feedback information.

TABLE 3

| Matrix Index (binary) | Column 1 | Column 2 |
|---|---|---|
| 000 | 1<br>0 | 0<br>1 |
| 001 | 0.7940<br>−0.5801 + j0.1818 | −0.581 − j0.1818<br>−0.7940 |
| 010 | 0.7940<br>0.0576 + j0.6051 | 0.0576 − j0.6051<br>−0.7940 |
| 011 | 0.7941<br>−0.2978 − j0.5298 | −0.2978 + j0.5298<br>−0.7941 |
| 100 | 0.7941<br>0.6038 + j0.0689 | 0.6038 − j0.0689<br>−0.7941 |
| 101 | 0.3289<br>0.6614 + j0.6740 | 0.6614 − j0.6740<br>−0.3289 |
| 110 | 0.5112 | 0.4754 + j0.7160 |

TABLE 3-continued

| Matrix Index (binary) | Column 1 | Column 2 |
|---|---|---|
| 111 | 0.4754 − j0.7160<br>0.3289<br>−0.8779 − j0.3481 | −0.5112<br>−0.8779 + j0.3481<br>−0.3289 |

If the codebook-based precoding and the phase shift-based precoding are applied simultaneously, the transmitter can receive periodically information of the preferred precoding index of the receiver, the CQI, and the frequency bandwidth having the best or acceptable channel condition. Having such feedback information as basis, the transmitter can use the same precoding index and can perform scheduling of preferred data stream(s) to different receivers (e.g., MSs) on the same frequency and the same time frame.

Furthermore, the memory (not shown) of Embodiment #2 can include more codebooks for precoding compared to that of Embodiment #1. Moreover, the receiver circuit (not shown) of Embodiment #2 can receive more information associated with codebook index for selecting precoding matrix from the codebook compared to that of Embodiment #1.

The transmitter and the receiver with respect to Embodiments #1 and #2 can include an interleaver (not shown) for performing interleaving by parsing code bits so as to minimize loss caused by noise in transmitting data. Moreover, an inverse fast Fourier transform (IFFT) (not shown) can be included for allocating the precoded transmit symbols to the subcarriers in the time domain. In addition, the transmitter and the receiver with respect to Embodiments #1 and #2 can also include a filter (not shown) for converting the transmit symbols to high frequency signals, and an analog converter (not shown).

Further, the following discussion relates to a simulation or a test the capability of the phase shift-based precoding in a multi-user, multi-antenna system. Table 4 shows the results of the simulation or the test.

TABLE 4

| Parameter | Configuration |
|---|---|
| System Structure | 3GPP LTE system (OFDMA-based downlink) |
| OFDM Parameters | 5 MHz (300 + 1 subcarriers) |
| Subframe Length | 0.5 ms |
| Resource Block Size | 75 subcarriers * 4 OFDM symbol |
| Channel Models | ITU Pedestrian A, Typical Urban (6-ray) |
| Mobile Speed (km/h) | 3 |
| Modulation Schemes and Channel Coding Rates | QPSK (R = 1/3, 1/2, 3/4)<br>16-QAM (R = 1/2, 5/8, 3/4)<br>64-QAM (R = 3/5, 2/3, 3/4, 5/6) |
| Channel Code | Turbo code Component decoder: max-log-MAP |
| MIMO Mode | MU-MIMO |
| Resource Allocation | Localized mode |
| Antenna Configuration | [2Tx, 2Rx] |
| Spatial Correlation (Tx, Rx) | (0%, 0%), (70%, 70%) |
| MIMO Receiver | MMSE receiver |
| Channel Estimation | Perfect channel estimation |
| H-ARQ | Bit-level chase combining<br># of Maximum Retransmission: 3 TTIs<br># of Retransmission delay: 3 TTIs |

Figure 11A:
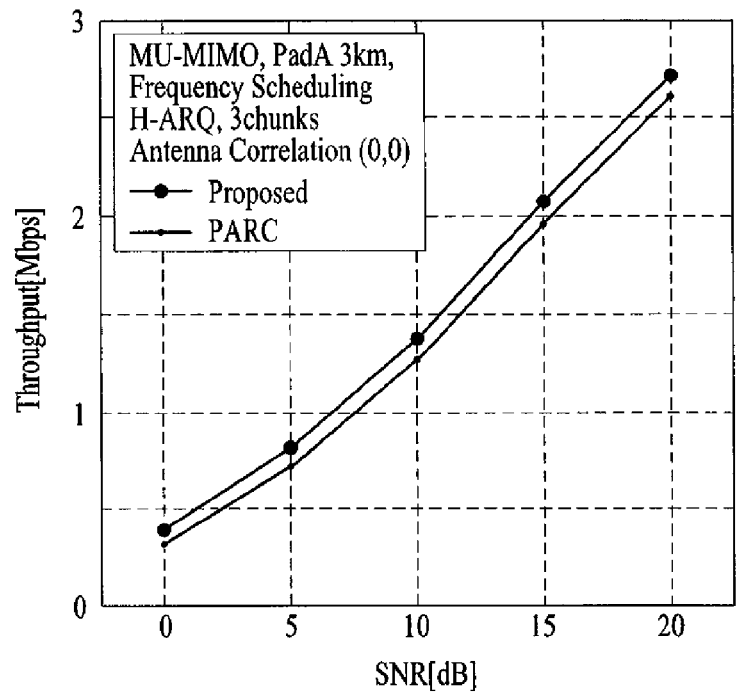
FIG. 11A is an exemplary diagram illustrating a comparison between a conventional PARC and the method of the present invention in an environment where there is no spatial correlation in an ITU PedA channel.
Figure 11B:
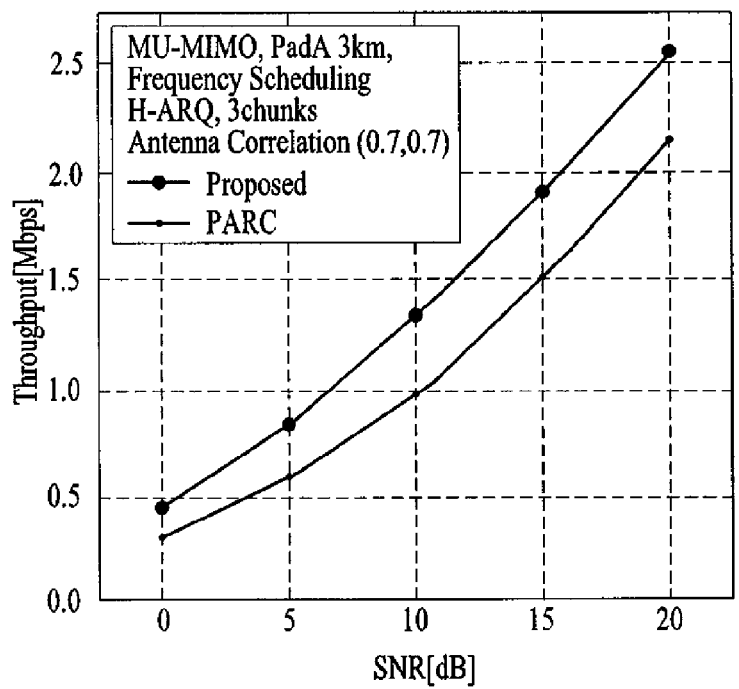
FIG. 11B is an exemplary diagram illustrating a comparison between a conventional PARC and the method of the present invention in an environment where the spatial correlation is 70%.

FIG. 11A is an exemplary diagram illustrating a comparison between a conventional PARC and the method of the present invention in an environment where there is no spatial correlation in an ITU PedA channel. FIG. 11B is an exemplary diagram illustrating a comparison between a conventional PARC and the method of the present invention in an environment where the spatial correlation is 70%.

Referring to FIGS. 11A and 11B, the throughput according to the present invention is always higher than the transmit method of PARC, regardless of the spatial correlation of the transmitter and the receiver. Furthermore, the difference is noticeably amplified as the spatial correlation of the transmitter and the receiver is increased. That is, the overall transmit capability is increased due to decrease in multi-user interference.

Figure 12A:
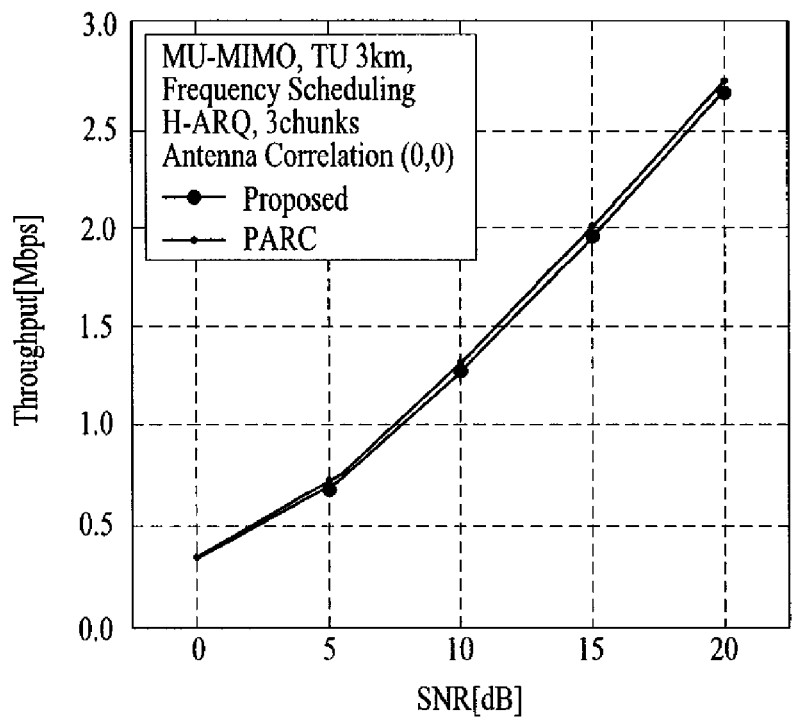
FIG. 12A is an exemplary diagram illustrating a comparison between a conventional PARC and the method of the present invention in a TU channel having high frequency selection.
Figure 12B:
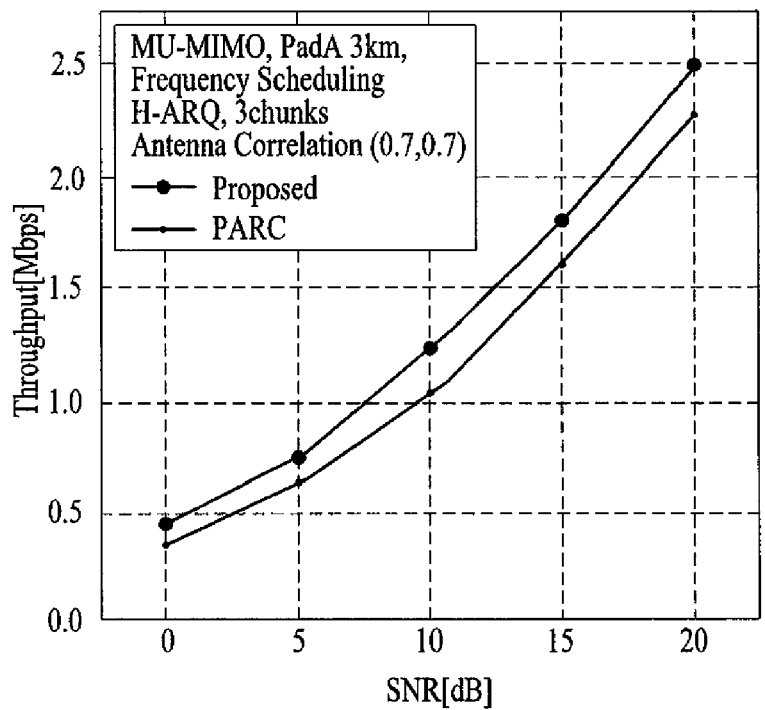
FIG. 12B is another exemplary diagram illustrating a comparison between a conventional PARC and the method of the present invention in a TU channel having high frequency selection.

FIG. 12A is an exemplary diagram illustrating a comparison between a conventional PARC and the method of the present invention in a TU channel having high frequency selection. FIG. 12B is another exemplary diagram illustrating a comparison between a conventional PARC and the method of the present invention in a TU channel having high frequency selection.

Referring to FIG. 12A, the difference is minimal between the PARC and the present invention, regardless of the spatial correlation. In FIG. 12B, with the spatial correlation of the transmitter and the receiver at 70%, the throughput is increased by 15% as a result of SNR gain due to codebook-based precoding.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method performed by a receiver to receive signals from a transmitter having a plurality of antennas, the method comprising:
    receiving the signals from the transmitter;
    selecting a precoding matrix based on a multiplexing rate (R) by selecting R column vectors from a single matrix corresponding to a maximum multiplexing rate corresponding to a number ($N_t$) of the plurality of antennas, wherein each column vector of a first precoding matrix corresponding to a first multiplexing rate is included as a part of column vectors of a second precoding matrix corresponding to a second multiplexing rate when the second multiplexing rate is greater than the first multiplexing rate; and
    processing the received signals using the selected precoding matrix.

2. The method of claim 1,
    wherein the single matrix corresponding to the maximum multiplexing rate comprises $N_t$ column vectors, and
    wherein the selected precoding matrix comprises M column vectors selected from the $N_t$ column vectors of the single matrix.

3. The method of claim 1,
    wherein the selected precoding matrix is represented as $$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix},$$

wherein $w_{i,j}^k$ (i=1, ..., $N_t$, j=1, R) denotes a complex weight value determined according to k, and k denotes a resource index, and wherein the selected precoding matrix is a unitary matrix meeting Equations A and Equations B as follows:

$$|w^k_{1,1}|^2 + |w^k_{2,1}|^2 + \ldots + |w^k_{N_t,1}|^2 = 1,$$ [Equation A]
$$|w^k_{1,2}|^2 + |w^k_{2,2}|^2 + \ldots + |w^k_{N_t,2}|^2 = 1,$$
$$\vdots$$
$$|w^k_{1,R}|^2 + |w^k_{2,R}|^2 + \ldots + |w^k_{N_t,R}|^2 = 1$$

$$w^{k*}_{1,1} w^k_{1,2} + w^{k*}_{2,1} w^k_{2,2} + \ldots + w^{k*}_{N_t,1} w^k_{N_t,2} = 0,$$ [Equation B]
$$w^{k*}_{1,1} w^k_{1,3} + w^{k*}_{2,1} w^k_{2,3} + \ldots + w^{k*}_{N_t,1} w^k_{N_t,3} = 0,$$
$$\vdots$$
$$w^{k*}_{1,1} w^k_{1,R} + w^{k*}_{2,1} w^k_{2,R} + \ldots + w^{k*}_{N_t,1} w^k_{N_t,R} = 0.$$

4. The method of claim 1,
    wherein the selected precoding matrix is a part of a phase shift-based precoding matrix, and
    wherein processing the received signals comprises using the phase shift-based precoding matrix.

5. The method of claim 4, wherein the phase shift-based precoding matrix comprises:
    a diagonal matrix (D) represented as:

$$\begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix},$$

wherein $\theta_i$ denotes a phase angle for each column of the diagonal matrix (D); and a unitary matrix (U) meeting $U^H * U = I$, wherein I denotes an identity matrix.

6. A receiving device for receiving signals from a transmitter having a plurality of antennas, the receiving device comprising:
    a receiver for receiving the signals from the transmitter; and
    a processor configured to select a precoding matrix based on a multiplexing rate (R) by selecting R column vectors from a single matrix corresponding to a maximum multiplexing rate corresponding to a number ($N_t$) of the plurality of antennas, and to process the received signals using the selected precoding matrix, wherein each column vector of a first precoding matrix corresponding to a first multiplexing rate is included as a part of column vectors of a second precoding matrix corresponding to a second multiplexing rate when the second multiplexing rate is greater than the first multiplexing rate.

7. The receiving device of claim 6,
    wherein the single matrix corresponding to the maximum multiplexing rate comprises $N_t$ column vectors, and
    wherein the selected precoding matrix comprises M column vectors selected from the $N_t$ column vectors of the single matrix.

8. The receiving device of claim 6,
    wherein the selected precoding matrix is represented as $$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix},$$

wherein $w_{i,j}^k$ ($i=1, \ldots, N_t$, $j=1, R$) denotes a complex weight value determined according to k, and k denotes an index of resource, and wherein the selected precoding matrix is a unitary matrix meeting Equations A and Equations B as follows:

$$|w^k_{1,1}|^2 + |w^k_{2,1}|^2 + \ldots + |w^k_{N_t,1}|^2 = 1,$$
$$|w^k_{1,2}|^2 + |w^k_{2,2}|^2 + \ldots + |w^k_{N_t,2}|^2 = 1,$$
$$\vdots$$
$$|w^k_{1,R}|^2 + |w^k_{2,R}|^2 + \ldots + |w^k_{N_t,R}|^2 = 1$$
[Equation A]

$$w^{k*}_{1,1}w^k_{1,2} + w^{k*}_{2,1}w^k_{2,2} + \ldots + w^{k*}_{N_t,1}w^k_{N_t,2} = 0,$$
$$w^{k*}_{1,1}w^k_{1,3} + w^{k*}_{2,1}w^k_{2,3} + \ldots + w^{k*}_{N_t,1}w^k_{N_t,3} = 0,$$
$$\vdots$$
$$w^{k*}_{1,1}w^k_{1,R} + w^{k*}_{2,1}w^k_{2,R} + \ldots + w^{k*}_{N_t,1}w^k_{N_t,R} = 0.$$
[Equation B]

9. The receiving device of claim 6, wherein the selected precoding matrix is a part of a phase shift-based precoding matrix, and wherein the processor processes the received signals by using the phase shift-based precoding matrix.

10. The receiving device of claim 9, wherein the phase shift-based precoding matrix comprises:

a diagonal matrix (D) represented as:

$$\begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix},$$

wherein $\theta_i$ indicates a phase angle for each column of the diagonal matrix (D); and a unitary matrix (U) meeting $U^H * U = I$, wherein I denotes an identity matrix.

* * * * *